April 17, 1962 C. R. TOMPSON 3,029,772

WAVE-SIGNAL RECEIVER

Filed Aug. 5, 1960

INVENTOR.
Clement R. Tompson
BY John J. Pederson
Atty.

3,029,772

WAVE-SIGNAL RECEIVER

Clement R. Tompson, Melrose Park, Ill., assignor to Zenith Radio Corporation, a corporation of Delaware Filed Aug. 5, 1960, Ser. No. 47,864
2 Claims. (Cl. 116—124.4)

This invention pertains to tuning indicators for multiple-channel wave-signal receivers and the like. Having found immediate acceptance for use with television receivers, it will be described in that connection.

The invention provides improvements in illuminated channel-position indicators of a type which have been extensively used on television receivers. The desirability of such indicators from the standpoint of viewer convenience, if not almost a necessity when operating the receiver remotely, has resulted in ready acceptance by the public. One popular kind of indicator is that employing the projection of a channel-figure or number onto a translucent screen. This form is in the nature of a shadow box in which light is projected through a character-defining mask onto a screen.

There is a decided trend in the television industry toward small receivers arranged to maintain the viewing ease and quality heretofore found only in larger receivers. To that end, it is desirable to reduce the size of the operating knobs, such as the channel selector, but where the knob also serves as the channel indicator, it has proved difficult to effect a size reduction and yet retain an adequate channel indication. This difficulty is readily appreciated when one gives consideration to the finding that for the usual viewing area the channel indication should be ⅝ inch in height or even larger for comfortable reading. Prior structures which satisfy this requirement have knob dimensions that are too large for easy adaptation to small receivers.

Miniaturization of such prior knob assemblies has usually entailed increasing the distance from the light source and shadow mask to the projection screen so as to obtain the proper magnification of the channel indicia. However, this results in an undue increase in the depth of the knob assembly and a defocusing or loss of crispness of the projected channel indicia.

It is therefore an object of this invention to provide a channel-indicator knob assembly of reduced physical size which retains a prescribed minimum size for the projected channel number.

It is a further object of the invention to provide a tuning indicator for a wave-signal receiver wherein the overall dimensions of the screen and the knobs are reduced while maintaining the sharpness and size of image for ease of viewing.

A tuning indicator for a wave-signal receiver, constructed in accordance with the invention, comprises a translucent screen disposed across a predetermined axis. A light source is positioned to one side of the axis, projecting light along a given path to the screen. There is a generally cylindrical indicator having a plurality of light transparent portions, and means are provided for adjustably supporting the indicator to introduce any selected one of the light transparent portions into the light path in such angular relationship to the screen that the projection distance to the screen and the magnification resulting from the projection vary non-uniformly over the selected indicator portion. Each of the transparent portions of the indicator has a pattern shaped to designate a particular tuning condition of the receiver and the dimensioning of the pattern is non-uniform to compensate for the aforesaid non-uniformity of magnification. Means are provided for tuning the receiver, and means are provided for adjusting the indicator in response to operation of the tuning means to correlate the selected portion of the indicator with the tuning condition of the receiver. A generally cylindrical control member surrounds the indicator and has a peripheral transparent section coordinate to the transparent indicator portions; the transparent section of this control member may have a prismatic shape to aid in directing the light to the screen.

The features of the invention which are believed to be novel are set forth with particularity in the appended claims. The invention, together with further objects and advantages thereof, may best be understood however by reference to the following description taken in connection with the accompanying drawings, the several figures of which like reference numerals identify like elements and in which:

Figure 1:
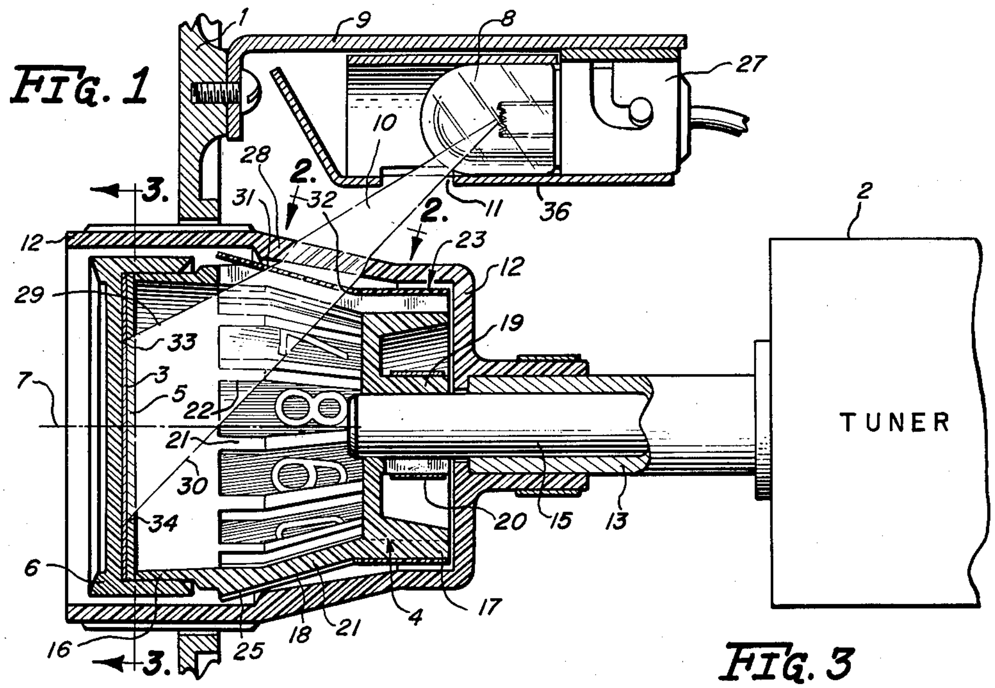
FIGURE 1 is a fragmentary side elevational view, partly in cross-section, of a preferred embodiment of the invention, including a control knob shown in greater detail in FIGURES 2–5.

A portion of a television receiver embodying the invention is shown in FIGURE 1 wherein only the front panel of the cabinet 1 is shown. Inasmuch as the invention itself is not directly concerned with the operative electrical circuits of the receiver, only those structural elements necessary to an understanding of the invention have been shown. The receiver includes a tuning device 2 which may be of any suitable type; in any event, channel selection is accompanied by rotation of a shaft 15, which may be a continuation of the same shaft employed for driving the tuner from one channel to another. The tuning indicator itself comprises a translucent screen 3 at one end of an indicator support member 4 and is secured in place by a transparent sheet 5 and a container ring 6. Translucent screen 3 is disposed across a predetermined axis 7 corresponding to the axis of tuner shaft 15.

Figure 4:
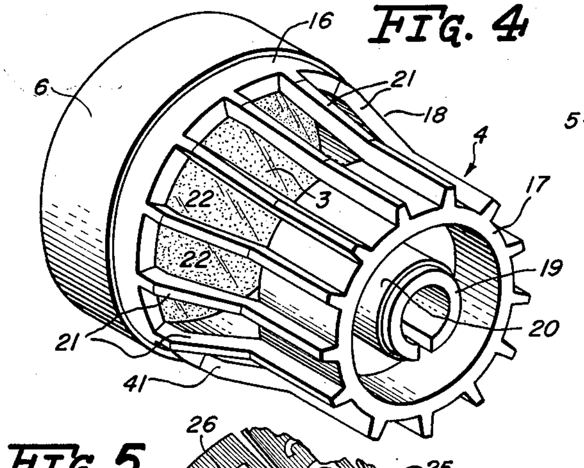
FIGURE 4 is a reduced perspective view of a portion of the apparatus of FIGURE 1.

Indicator support member 4 is shown in greater detail in FIGURE 4 and comprises two substantially cylindrical end sections 16, 17 of different diameters, with an intermediate tapered section 18. Translucent screen 3 is of course supported at the larger cylindrical end section 16, while the smaller cylindrical end section 17 is provided with a stub 19 which is frictionally held to tuner shaft 15 by means of the clamping ring 20. Indicator support member 4 is provided with a plurality (one greater than the number of detented positions of tuner device 2) of uniformly spaced paraxially extending spline members or ribs 21; spline members 21 define or set apart a plurality of light transparent areas 22 in tapered intermediate section 18. In the preferred embodiment of the invention, light transparent areas 22 are constituted by openings between spline members 21. The entire indicator support member shown in FIGURE 4, with the exception of container 6 and translucent screen 3, may be formed as a unitary piece of molded plastic.

Figure 5:
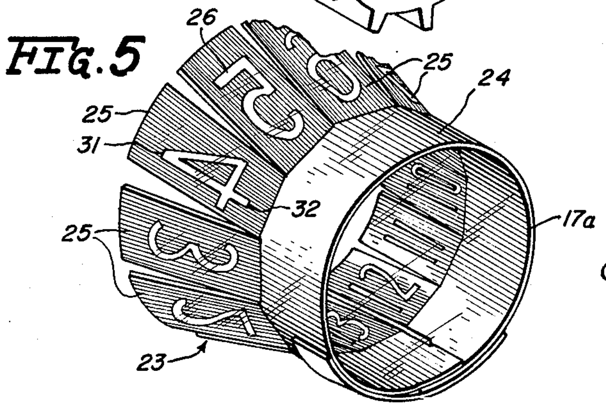
FIGURE 5 is a reduced perspective view of another portion of the apparatus of FIGURE 1.

FIGURE 5 shows the indicator element 23 associated with indicator support member 4 of FIGURE 4. Indicator element 23 is constructed of Celluloid or the like and comprises a generally cylindrical member 24 at one end from which extends a plurality of longitudinal tabs 25 which are flared outwardly in order to conform generally to the configuration of tapered intermediate section 18 of indicator support member 4 of FIGURE 4. The number of tabs corresponds to the number of detented positions of tuner 2, and consequently to the number of transparent areas 22 of indicator support member 4, and tabs 25 are dimensioned to individually overlap apertures or transparent areas 22 when indicator element 23 of FIGURE 5 is slipped over smaller cylindrical end section 17 of indicator support member 4 to juxtapose tabs 25 with light transparent areas 22, in the manner shown in the fragmentary view of FIGURE 2. Each of the tabs 25 is provided with a pattern shaped to designate a particular tuning condition of the receiver, corresponding to the station or channel selected when the tuner 2 is detented in the position which places the individual tab in the light path 10. In accordance with conventional practice, the VHF (very-high-frequency) television channels are numerically designated from 2 to 13, and corresponding numerical indicia are therefore provided on tabs 25.

The tuning indicator of FIGURE 1 also comprises a light source such as electric light bulb 8 positioned above and to the rear of the tapered intermediate section 18 of indicator support member 4. Bulb 8 is mounted in a socket 27 secured to bracket 9 which is bolted to the front panel of cabinet 1 and bulb 8 is surrounded by a shield member 36 provided with aperture 11 for defining the boundaries of light path 10 projected through the indicator element onto translucent screen 3. The size and location of aperture 11 are such that the projected images of the indicia 26 inscribed on indicator 17 are of the desired height and are centered on translucent screen 3.

An additional control knob 12 encompasses indicator support member 4 and indicator element 23 and is fixed to an additional control shaft 13 which is concentric with tuner shaft 15 and is arranged in a conventional manner, as shown for example in the above-identified Steinke patent 2,907,298, to control an additional operating characteristic of the receiver, such as the sound volume, picture brightness, or receiver fine tuning. Control knob 12 includes a transparent intermediate tapered prism section 28 extending all the way around the knob to admit light rays originating at source 8, and tapered intermediate section 28 of control knob 12 is made of non-uniform thickness, with the thicker portion at the front, to permit mounting of the light source at the illustrated location above the knob assembly; intermediate section 28 serves as a prism to bend the light rays and shift the apparent light source to a lower position so that the image is centered on screen 3. The construction of the remaining portions of the control knob 12 are not material to the present invention, but in the interest of a simplicity it is preferred to cast the entire control knob as a unitary transparent molded plastic piece. Member 4, of course, turns with shaft 15 which, as stated above, may be an extension of the same shaft used for manually or automatically controlling tuner 2.

In the preferred embodiment of the invention, indicator element 23 of FIGURE 5 may be formed of opaque Celluloid or the like, with indicating indicia 26 punched out of the respective tabs 25, so that the lighted area on screen 3 corresponds to the selected indicium. Alternatively, indicator element 23 may be constituted of transparent Celluloid, with opaque indicia inscribed on the respective tabs, to provide a "negative" image on translucent screen 3.

Light emanates from light source 8 and is projected through aperture 11, through the tapered prism portion of the control knob 12, through transparent portion or indicia 26 and onto screen 3. It is to be noted that the distance of travel 29 in the light path is less than the distance of travel 30 in the light path. Since the magnification of any given portion of the light transparent portion is dependent upon the distance of travel from the indicia to the screen of projection, it is apparent that magnification of the shadow is different at the upper and lower boundaries; that is, the projection of 31 at 33 is narrower than that of 32 at 34.

Figure 3:
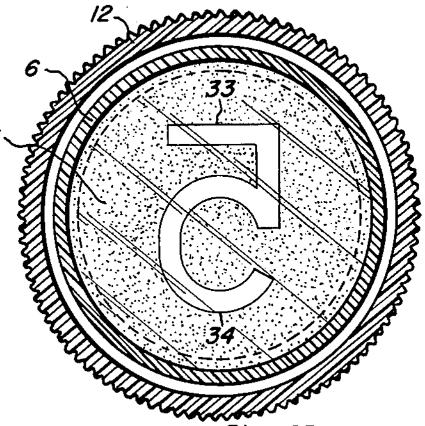
FIGURE 3 is a cross-sectional view taken along the line 3—3 of FIGURE 1.
Figure 2:
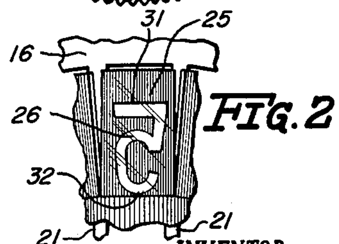
FIGURE 2 is a fragmentary view of a portion of the control knob shown in FIGURE 1 as seen in the direction indicated by line 2—2 of FIGURE 1.

The portion of tab 25 which is transparent to light is shown in more detail in FIGURE 2, in which an illustrative indicium 26 has a pattern shaped to cast a shadow of the particular tuning condition represented by the numeral "5." The dimensioning of the pattern is non-uniform to compensate for the previously described non-uniformity of magnification. This is done by varying the width of the pattern from top 31 to bottom 32 as an inverse function of the variation in the lengths of the individual light rays from the shortest, uppermost, ray 29 to the longest, lowermost, ray 30. Hence, the resulting image cast on screen 3 has uniform dimensions, as shown in FIGURE 3.

In the illustrated embodiment, rotation of shaft 15 in response to rotation of the tuner rotates the indicator support member 4 shifting one tab out of light path 10 and rotating a second tab into the reference position, so that the light is projected through the next transparent portion.

Thus the invention provides a new and improved illuminated channel indicator knob assembly of reduced size while maintaining image size and sharpness unimpaired.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A tuning indicator for a wave-signal receiver comprising:

a hollow control member of generally cylindrical shape rotatably mounted about a predetermined axis and having a peripheral transparent portion;

means coupling said control member to an adjustable control function element of said receiver;

a generally cylindrical indicator having a plurality of light-transparent portions each having a pattern shaped to designate a particular tuning condition of said receiver;

a support member for supporting said indicator concentrically with said axis with its light-transparent portions in juxtaposition with and substantially parallel to said peripheral transparent portion of said control member;

a translucent screen mounted on said support member and disposed across said axis;

a light source laterally displaced outwardly from the said transparent portion of said control member for projecting light obliquely along a given path through said peripheral transparent portion of said control member to said translucent screen;

and means for concurrently tuning said receiver and rotating said indicator support member to introduce a selected one of said light-transparent portions of said indicator, correlated with the tuning condition of said receiver, into said light path, whereby the projection distance to said screen and the resultant magnification of the obliquely projected image of said selected light-transparent portion are non-uniform, the dimensioning of said patterns being non-uniform to compensate the aforesaid non-uniformity of magnification.

2. A tuning indicator for a wave-signal receiver as specified in claim 1, in which said peripheral transparent portion of said control member is tapered in thickness to constitute a prism in said light path.

References Cited in the file of this patent

UNITED STATES PATENTS

| | | |
|---|---|---|
| 2,681,634 | Polley | June 22, 1954 |
| 2,808,018 | Foster | Oct. 1, 1957 |
| 2,907,298 | Steinke | Oct. 6, 1959 |